United States Patent [19]

Bates et al.

[11] Patent Number: 4,830,417
[45] Date of Patent: May 16, 1989

[54] BUMPER SUPPORTING ENERGY ABSORBER WITH MATCH LINE ADJUSTER

[75] Inventors: Joseph A. Bates, Dayton; James M. Koontz, Jr., Beavercreek, both of Ohio; John D. Garner, Chelmsford, England

[73] Assignee: General Motors Corporation, Detroit, Mich.

[21] Appl. No.: 82,322

[22] Filed: Aug. 6, 1987

[51] Int. Cl.⁴ .......................................... B60R 19/32
[52] U.S. Cl. ................... 293/134; 293/132; 267/116; 403/4; 403/299
[58] Field of Search ................. 293/102, 1, 126, 127, 293/131, 132, 133, 134, 155, 119; 267/113, 116, 139; 403/4, 299, 343; 411/384, 397

[56] References Cited

U.S. PATENT DOCUMENTS

| | | | |
|---|---|---|---|
| 2,678,226 | 5/1954 | Wright | 403/299 X |
| 3,415,553 | 12/1968 | Baugh | 411/384 X |
| 3,563,131 | 2/1971 | Ridley, Sr. | 411/384 |
| 3,663,048 | 5/1972 | Zimmerle | 293/134 X |
| 3,700,273 | 10/1972 | Jackson et al. | 293/134 |
| 4,059,301 | 11/1977 | Meyer | 293/120 |
| 4,097,080 | 6/1978 | Petry | 293/134 |
| 4,303,267 | 12/1981 | Haberle et al. | 293/155 |

*Primary Examiner*—Robert B. Reeves
*Assistant Examiner*—Russell D. Stormer
*Attorney, Agent, or Firm*—Charles R. White

[57] ABSTRACT

An energy absorbing bumper unit attaching a bumper to a vehicle which incorporates a threaded jack screw that varies the distance between the screw and the side rail to accordingly tilt the energy absorber unit and the bumper assembly for effecting a mating of adjacent surfaces of the bumper and the bodywork of the vehicle to obtain a predetermined match line with reduced gap between the bumper and the body work.

2 Claims, 1 Drawing Sheet

BUMPER SUPPORTING ENERGY ABSORBER WITH MATCH LINE ADJUSTER

This invention relates to energy absorbers for vehicle bumpers and more particularly to a new and improved bumper supporting energy absorber which provides for optimized energy management and further provides for adjustment of match lines occurring between the bodywork of the vehicle and the bumper assembly.

Various energy absorber units have been provided to support impact bumpers and to effectively dissipate energy of impact loads directed onto the bumper. An illustrative bumper and energy absorber combination is disclosed in U.S. Pat. No. 4,097,080, assigned to the assignee of this invention and hereby incorporated by reference, in which telescopic energy absorber units stroke on impact loads applied to the bumper that exceed those of a predetermined magnitude. When stroking, the energy of such impact loads is effectively dissipated by the forced transfer of fluid through an orifice separating fluid chambers of each of these units. The energy absorber unit of the present invention is of this general category but further incorporates a built in adjuster which grounds on support structure in the vehicle to vary orientation of the energy absorber unit for match line adjustment and conformation between the vehicle body work and bumper.

In a preferred embodiment of the present invention, a stationary component of the energy absorber unit is affixed to a bracket on the side rail of the vehicle frame while a telescopic component of the unit supports the bumper assembly. By varying the orientation or inclination of the energy absorber unit through a forced pivotal motion with respect to a centralized pivot point by use of the adjuster, the bumper assembly can be moved upwardly or downwardly to provide for match line adjustment between the bumper assembly and the body work of the vehicle. The bumper assembly preferably includes a fascia of plastics material and the body work is of sheet metal or plastics material. The adjustment readily conforms vertical or horizontal match lines.

In the preferred embodiment, the adjuster comprises a jack screw having a contact head located below the top of the frame rail which is adjusted through a slot in the frame rail. By turning the jack screw in one direction, the distance between a rear part of the unit and the top of the frame rail is increased to cause the energy absorber to tilt upwardly with respect to a turning point. By adjusting the jack screw to decrease the distance between the rear of the unit and the top of the frame rail, the energy absorber unit can be tilted downwardly. This is accomplished by the use of a locking screw threaded into the head of the jack screw from the top of the frame rail. The bumper assembly is connected to an outer end of the energy absorber unit. As the energy absorber tilts upwardly or downwardly, the bracket connection between the energy absorber unit and the frame rail is flexed until the design intent gap or match line conformation is achieved.

These and other features, objects and advantages of this invention will be more apparent from the following detailed description and drawing in which.

Figure 1:
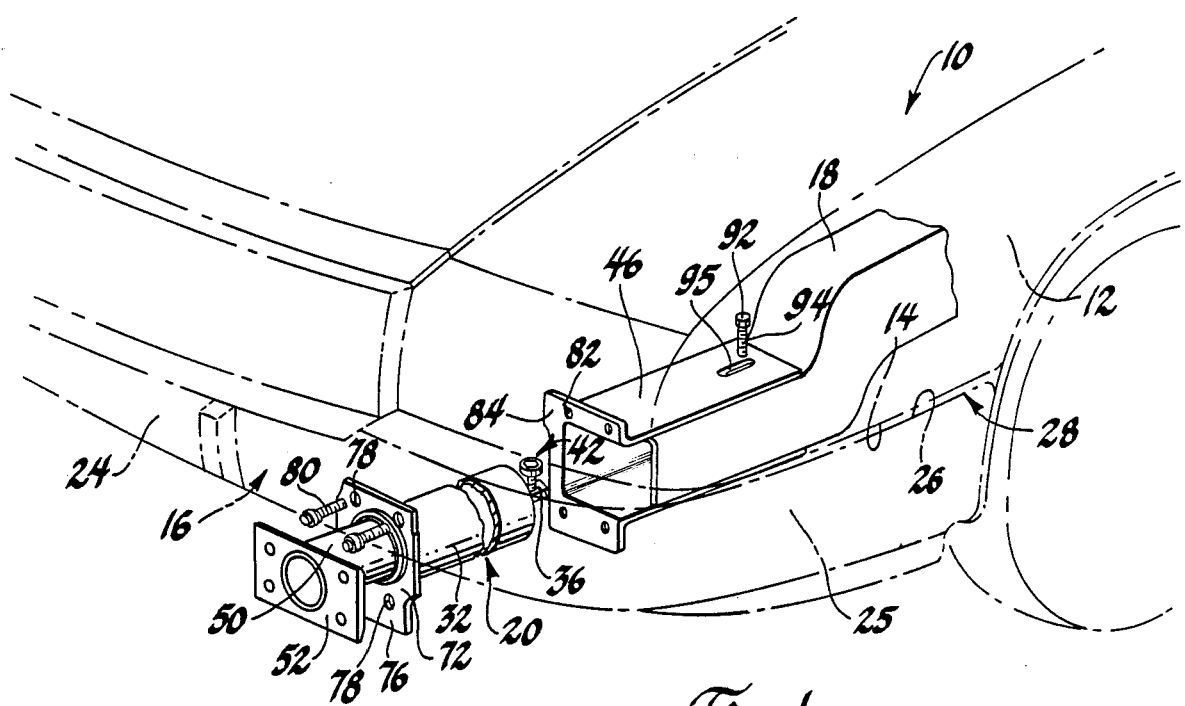
FIG. 1 is a pictorial view with parts exploded and parts in phantom line of a corner portion of a motor vehicle.

Turning now in greater detail to the drawing, FIG. 1 shows a forward portion of a vehicle 10 having exterior bodywork 12 of metal or plastic material which terminates in its left front corner in a generally longitudinally extending and lower edge 14. Vehicle 10 further has a bumper assembly 16 operatively mounted to the vehicle side rails or other support structure by a pair of telescopic energy absorber units. Only the left side rail 18 and left side energy absorber unit 20 are illustrated but substantially the same construction is employed for the right front corner of the vehicle as generally shown in the above-referenced U.S. Pat. No. 4,097,080.

The bumper assembly 16 preferably incorporates a fascia 24 having a forward face and a rearwardly swept side portion 25 which terminates in an upper edge 26 that lies closely adjacent to the lower edge 14 of the vehicle bodywork. Edges 14 and 26 form a generally longitudinally extending match line 28 that preferably exhibits minimized gap and with edges in a close parallel relationship to present a finely finished appearance.

However, because of manufacturing variances or limit stack, component parts sometimes do not provide a match that meets desired standards and their fits may result in a wide or tapered gap at the bumper assembly-body work match line. This heretofore has necessitated refitting or costly shimming to reach the desired finish.

Figure 2:
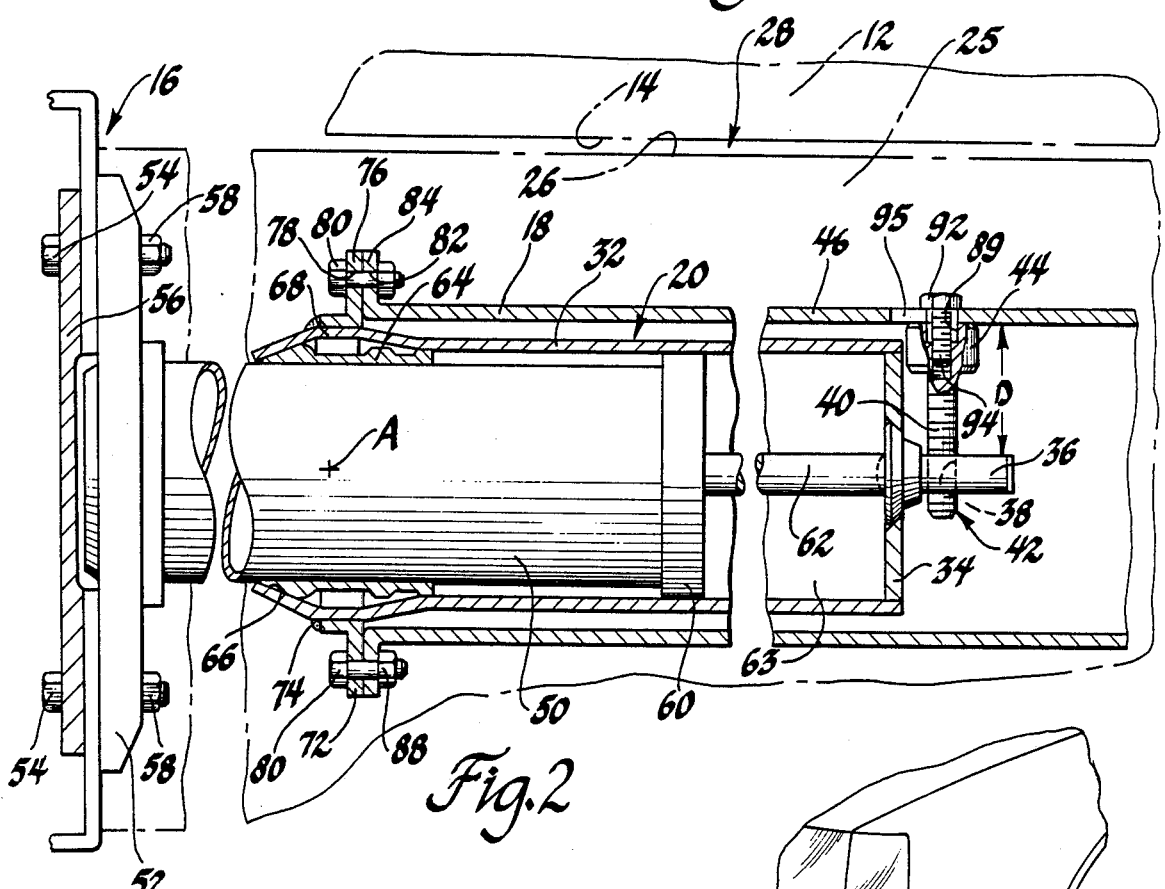
FIG. 2 is a cross-sectional view with parts in full line taken generally along lines 2—2 of FIG. 1 illustrating attachment of the bumper assembly to support structure in the vehicle.

The present invention provides for match line adjustment built directly into the energy absorbers that mount bumper assembly to the vehicle. To this end, each energy absorber unit 20 is mounted to an associated side rail 18 such as illustrated in FIGS. 1 and 2 and extends forwardly therefrom. Each energy absorber unit comprises an outer cylinder 32 closed by an end cap 34 which has a rearwardly projecting pin 36 welded or otherwise affixed to the end cap. This pin has a threaded vertical opening 38 therein which receives the threaded shank 40 of a jack screw 42 which terminates in a large diameter flat head 44 located at an adjusted position beneath the top wall 46 of the longitudinally extending side rail 18.

In addition to the outer cylinder 32, each energy absorber unit comprises an inner cylinder 50 mounted for telescopic movement within the outer cylinder 32 and which projects axially therefrom. The outermost end of the inner cylinder carries a mounting plate 52 which is adapted to be secured to the bumper assembly 16 by bolts 54 projecting from a bracket 56 fastened to the bumper and by nuts 58 threaded onto the end of the bolts as shown in FIG. 2.

The inner end of the inner cylinder 32 has a cap 60 with a centralized fluid flow orifice that accommodates a metering pin 62 that extends axially through expansible and contractible oil chamber 63 in the energy absorber unit from attachment with the end cap 34. The internal construction and operation of the energy absorber unit 20 is basically the same as that described in the above-identified U.S. Pat. No. 4,097,080 and for particular details of construction and operation, reference may be made to that patent. Generally, the energy absorber unit 20 is normally urged to an outwardly extending position in which a tapered annular stop sleeve 64 secured to the inner cylinder 50 engages the inwardly tapered interior surface 66 of the bulged forward end 68 of the outer cylinder by the pressure of a gas spring on a column of oil in the expansible and contractible chambers within the confines of the energy absorber unit as described in the referenced patent.

A rectangular mounting bracket 72 has a centralized collar which fits on the bulged forward end 68 of the outer tube 32 and is fastened thereto by annular weld 74. The flange 76 of this mounting bracket has openings 78 to receive bolts 80 extending therethrough and through matching openings 82 on the flange 84 defining the end of side rail 18. Nuts 88 are threaded onto the bolts 80 against the back of flange 84 to secure the energy absorber unit to the side rail.

With the bumper assembly 16 thus connected to the side rails as shown in FIGS. 1 and 2, the inner cylinder 50 and the attached bumper assembly can stroke with effective energy dissipation. When the bumper assembly is impacted by an impact load greater than a predetermined load, the telescopic retracting movement of the inner cylinder with respect to the outer cylinder will cause the flow of oil between the oil chambers of the energy absorbing unit through the metering orifice so that impact energy is dissipated. After the stroking of the unit, the energy absorber unit will, by the force exerted by the gas spring, return to its original position at a predetermined rate so that the bumper is again positioned in its outer design position.

In the event adjustment of the horizontal match line 28 is necessary, the jack screw 42 can be adjusted to conform the fit. To this end, the head 44 of the jack screw 42 has a hex opening 89 formed therein in alignment with the shank of the bolt. By insertion of an "Allen" wrench or other suitable tool through the elongated opening or slot 95 formed in alignment with hex opening 68 through the top of the side rail, a desired distance D shown in FIG. 2 can be obtained by advancing or retracting the screw 42. This action results in the up or down inclination of the energy absorber unit 20 which is generally turned with respect to point A shown in FIG. 2. This clockwise or counterclockwise pivotal motion about point A causes some deflection of the flanges of the mounting brackets of the energy absorber unit and the frame rail until the match line is conformed and the edges 14 and 26 are closely adjacent one another in parallel relationship and with minimized gap. The jack screw is set in position by a locking or set screw 92 whose shank 94 is inserted topside through slot 92 and is threaded into the head 44 of jack screw 42 as illustrated in FIG. 2. When tilting the energy absorber unit downwardly the jack screw is advanced into pin 36 initially leaving a clearance between top of head 44 of the jack screw and the bottom of the top wall of the side rail. Tilting occurs when the set screw 92 is installed and tightened to the FIG. 2 position so that the clearance is taken up.

Figure 3:
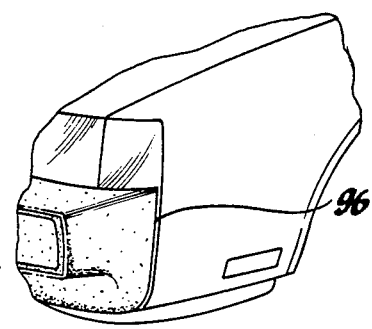
FIG. 3 is a pictorial view of a portion of a vehicle illustrating a vertical match line between the bumper assembly and the bodywork of a vehicle.

In the event that the match line adjustment involves a vertical match line 96 such as shown in FIG. 3, the same results can be obtained with the jack screw adjuster of this invention.

Instead of the adjusting screw arrangement shown in FIG. 2, other types of adjusting screws may be readily employed. For example, a ball headed screw can be used with the head captured in a socket suitably fixed to the top of the side rail so that only one screw is needed instead of double screw arrangement.

The above described preferred embodiment is illustrative of the invention which may be modified within the scope of the appended claims.

The embodiments of the invention in which an exclusive property or privilege is claimed are defined as follows:

1. An energy absorbing unit for mounting a bumper assembly to support structure of a motor vehicle, having said vehicle having body work with a finish edge, said bumper assembly having a finish edge adjacent to said finish edge of body work of a vehicle and defining a match line therebetween, said energy absorbing unit having a first operative part fixed to said support structure and a second operative part fixed to said bumper assembly, and jack screw means operatively mounted between said energy absorbing unit and said support part for tilting said energy absorbing unit with respect to a turning point to a final upwardly inclined attitude such that said finish edges of said bodywork and said bumper are in close proximity to one another to minimize clearance therebetween and optimize conformation of said match line parallel relationship, and set screw means threaded into said jack screw through said support structure to effect tilting of said energy absorber unit to a final downwardly inclined attitude such that said finish edges of said body work and said bumper are in close proximity to one another to minimize clearance therebetween and optimize conformation of match line parallel relationship.

2. An energy absorbing unit for mounting a bumper assembly to support structure of a motor vehicle, said vehicle having body work with a finish edge, said bumper assembly having a finish edge adjacent to said finish edge of said body work to define a match line therebetween, said energy absorbing unit having a first operative part fixed to said support structure and a second operative part fixed to said bumper assembly, and jack screw adjustment means threaded into said first operative part of said energy absorbing unit and for grounding on said support part for tilting said energy absorbing unit in one direction with respect to a point and to an attitude such that the finish edges define a close fit and an optimized match line, and set screw means extending through said support structure into said jack screw means for tilting said energy absorbing unit with respect to said point in a direction counter to said one direction.

* * * * *